United States Patent Office 3,785,931
Patented Jan. 15, 1974

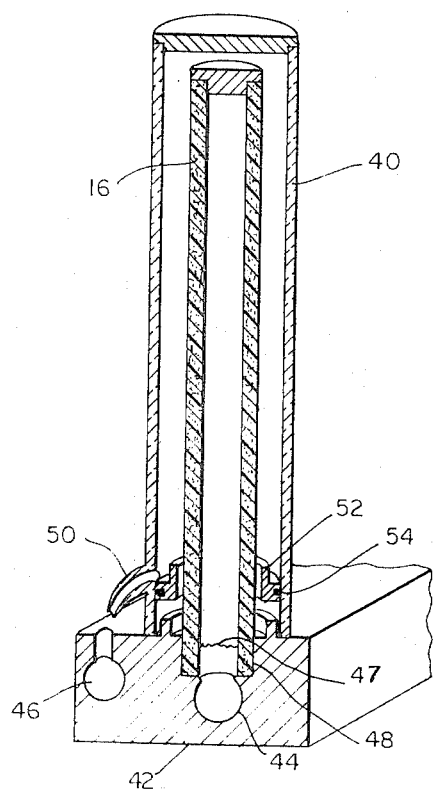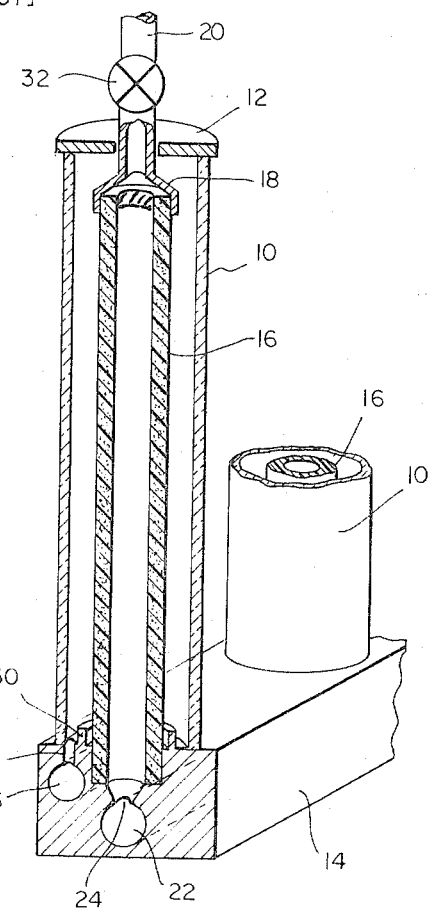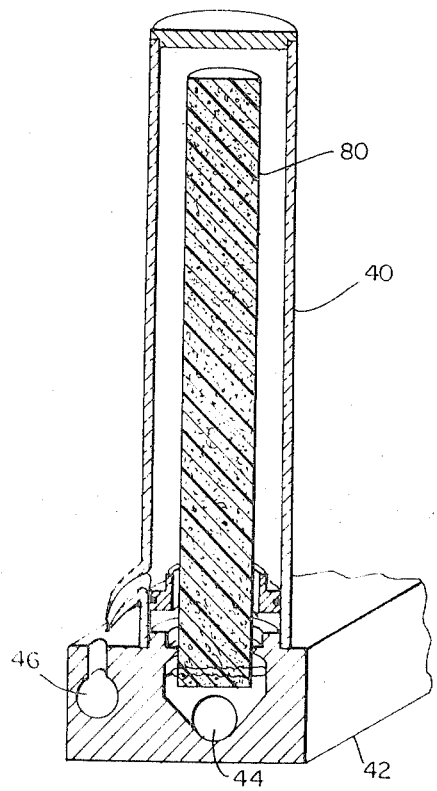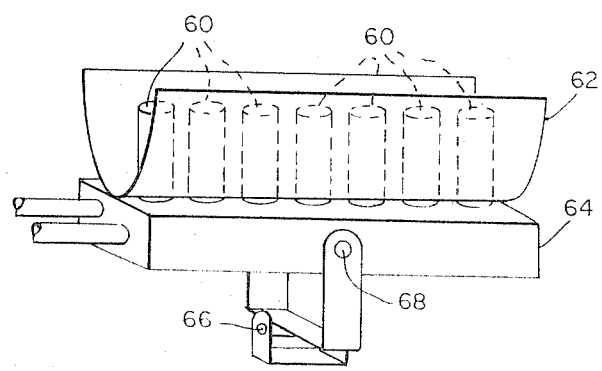

3,785,931
SELF CLEANING, TUBULAR SOLAR STILL
James P. Coffey, Hatboro, and Joseph C. Duddy,
Trevose, Pa., assignors to ESB Incorporated
Filed July 30, 1971, Ser. No. 167,751
Int. Cl. B01d 3/04
U.S. Cl. 202—234                                 12 Claims

ABSTRACT OF THE DISCLOSURE

A solar still is described in which a vertical microporous evaporator having a dark outer surface is housed within but separated from a transparent tube. Impure or salt water is fed up the porous evaporator either by mechanical means or by capillary forces from a reservoir at the tube base. Sunlight impinging on the inner dark tube causes water to evaporate therefrom. The vapor subsequently condenses on the inner surface of the transparent tube and runs down to a collecting ring at the base thereof. Concentration effects cause concentrated impurities to flow down the porous evaporator so that its surface pores do not become clogged. The transparent outer tube may be glass or plastic. Its inner surface may be treated to cause the condensed water to run down as a sheet rather than collect as drops. Reflectors or other light directing means may be placed about the tube to gather and concentrate the solar radiation reaching the dark tube. In an alternate design, impure water is fed to the top of the porous evaporator.

BACKGROUND OF THE INVENTION (a) Field of the invention

This invention relates to water purifying equipment. In particular, it relates to devices which distill salt water making use of solar heat.

(b) Description of the prior art

Many forms of solar still have been described. In a typical installation, a horizontal trough lined with black plastic is kept wet with a thin continuous sheet of impure water. Sunlight falling on the plastic sheet causes it to heat and evaporates water from the film. The water vapor is condensed and collected on a clear sheet material located a short distance above the black plastic sheet. The condensed water runs off the sheet into a fresh water collecting gutter. Other forms are known, such as those using reflectors to concentrate the light on a smaller heat absorbing area so as to permit operation at a higher temperature than without the concentrators. In generalities, it is found that the simple devices do not show very high efficiencies and the more elaborate devices require considerable upkeep.

SUMMARY OF THE INVENTION

A microporous evaporator having a dark exterior surface is located within but not touching a concentric tube of clear material serving as a condensing surface.

Raw water is fed to the top of the porous evaporator and slowly percolates down to the bottom of the member to a waste water drain. Sunlight hitting the dark evaporator surface causes water to evaporate giving off pure water vapor. The water vapor is condensed on the inside of the clear tube. As condensed water collects on the clear tube, it runs down to be collected as purified water. The evaporator and condenser tube are normally located in a vertical or near vertical position. For tropic installation, simple reflectors direct the sun's rays on one or more tubes. For operation at higher latitudes, the tubes can be positioned so as to be more or less perpendicular to an average sun ray taking account of latitude declination and times of sunlight, or reflectors can be so directed.

In a second embodiment, raw water is fed to the bottom of the microporous evaporator. Capillary forces carry the water up the tube.

A particular feature of the solar still of the invention is that it is self-cleaning.

In the case of the top fed evaporator, the slow flow of water down the member moves the concentrated brine to the waste water drain. In the second embodiment, salt resulting from the evaporation of salt water is returned by a concentration equilibrium from the evaporator to the raw water feed. It will be seen from this description that the device combines simplicity with high operating efficiency. It can be set up as small units having only a few tubes or it can be set up as a large multi-tube installation without sacrificing efficiency in either case. However, its principal feature is its ability to operate for long periods of time with minimum attention and upkeep. The parts are simple in shape and can be mass produced so as to bring the cost down to the reach of emerging cultures. Finally, it may be used as a device for concentrating dilute salt containing brines.

BRIEF DESCRIPTION OF THE DRAWINGS

FIG. 1 depicts in cross section a simplified solar still made in accordance with the present invention.

FIG. 2 depicts in cross section a modified design of solar still.

FIG. 3 depicts in elevation a small complete unit.

FIG. 4 depicts in cross section another embodiment of the invention.

DESCRIPTION OF THE PREFERRED EMBODIMENT

In FIG. 1, 10 represents a clear transparent condenser tube. The requirements for this tube are that it be transparent, thin and that it have a good heat transfer coefficient. Suitable tubes have been made of glass or of a methyl-methacrylate, polycarbonate, polyvinyl chloride and polystyrene, etc. The top 12 of the tube is sealed off as shown and the bottom of the tube is cemented or otherwise fastened to a base 14. A second or evaporating tube 16 is located within and concentric with clear tube 10. The walls of the evaporating tube 16 are microporous and the material is an inert plastic such as polyethylene, polypropylene, polyvinyl chloride, polystyrene, natural rubber or artificial rubber. A preferred method for fabricating the microporous tubes is described in U.S. Pat. 3,375,208. The tube has a comparatively thick wall, about ⅜-inch thick. Further, it is either pigmented so as to have a black color or the outside is coated with a flat black paint so as to provide a surface for maximum retention of radiation.

The evaporation tube 16 is also attached to base 14. The top of tube 16 is connected by means of a simple distributor 18 to a water feed pipe 20. The purpose of distributor 18 is to feed water from pipe 20 to the walls of the porous tube only and not to its center. Two conduits are formed in the base 14. The first conduit 22 is a waste water conduit. It is connected to and drains the bottom of the evaporation tube 16 by means of passage 24. Brine, concentrated by the evaporation of water from tube 16, drips or diffuses from the bottom of tube 16 into conduit 22. The second conduit 26 is the fresh water conduit. This conduit is connected to the base of the condenser tube 10 by passage 28. Water drops, condensed on the inside wall of the condenser tube 10, run down it to the base. An annular dam 30 confines the fresh water and leads it to the passage 28 and conduit 26. For maximum evaporation, there should be enough water passing down the tube 16 so that all parts of the surface are wet. There also must be some water passing out the bottom of the tube to wash out the salt or other impurities concentrated by the distillation process. Water passing down the column is heated to some extent and any water that passes out of the system represents a heat loss. Therefore, it is desirable that the flow of excess water be limited to the least possible required to control the build-up of impurities in the porous tube. A valve or other means as shown at 32 is provided to control the flow of water down tube 16.

In a second embodiment of the invention shown in FIG. 2, a microporous dark surfaced evaporation tube 16 is located concentrically within a clear transparent condenser tube 40, similar in properties to the tube 10 of FIG. 1. Both tubes are mounted on a base 42. Base 42 encloses a raw water conduit 44 and a fresh water conduit 46. Level controlling means, not shown, maintain the level of the raw water to a predetermined water level as shown by level line 47. The mounting of the evaporation tube 16 in the base 42 is such that a lower portion 48 of the evaporation tube 16 is always submerged in the water of the conduit. Under this condition, water is drawn by capillary forces from the bottom of the evaporation tube to the top. It has further been found that the impurity level in the evaporating tube comes to an equilibrium and that by a mechanism not fully understood concentrated impurities descend the tube and are returned to the raw water conduits. Control of the feed back of impurities is a function of the height and wall thickness of the microporous tube as well as of its material of construction and the size of its micropores.

Thus, the feeding of water to the evaporating tube and the removal of waste products therefrom in this embodiment of the invention is completely automatic and depends solely on parameters built into the distillation apparatus at the time of its design.

For moderate size tubes of a size that can be fed by capillary forces, the design of FIG. 2 may be used. If, however, extremely large units are required, it will be necessary to make use of the top feed design of FIG. 1.

In FIG. 2, a fresh water outlet 50 is shown located near the bottom of condenser tube 40. This outlet conducts fresh water collected on the inside of condenser tube 40 to the fresh water conduit 46. A circular dam 52 is located within tube 40 and sealed thereto by gasket 54. This dam directs the condensed fresh water to the outlet 50.

It will be seen that the design lends itself to a series of stills arranged in a row on a single long base 14 and that when so arranged, each still is an independent unit functioning regardless of the other tubes.

It has been found that a treatment to the inner surface of tube 10 aids the condensed water to wet and run down the tube without the formation of droplets and fog, both of which tend to reduce the penetration of solar rays. The treatment consists in coating the surface with a surfactant such as sodium lauryl sulfate and similar materials well known to the trade.

In a further embodiment of the invention, reflectors are provided to channel the sun's rays onto the distillation tube. In FIG. 3, a trough-shaped reflector 62 collects and distributes sunlight on the sides of the tubes 60 more or less regardless of the location of the sun in the sky. As shown in FIG. 3, the distillation tubes 60 are mounted on a single base 64. A cross section of the reflector may be semi-circular, semi-elliptical, or even V-shaped to good advantage.

A further refinement of the solar still of the invention is shown in FIG. 3. The base 64 is mounted in gimbals with a declination axis 69 and a diurinal axil 68 so that the entire unit can be directed most effectively toward the sun's rays. The declination orientation can be adjusted, for example, on a weekly or monthly basis. It is usually not necessary to adjust the diurinal axis, however, this may be done by clockwork or other timing means. If the distillation apparatus is set up with reflectors as in FIG. 3, the axis of the reflector should point toward the sun. However, when reflectors are not used, the axis of the evaporation tube should be as near as possible at right angles to the sun's rays.

EXAMPLE 1

An evaporation tube 5¼ inches long and ⅞ inch in diameter was set perpendicular in latitude 39° N. Under these conditions and using 3½% saline solution, it produced an average of 1 cc. fresh water per hour for an extended period of time. When reflectors were located at the base of the tube, the production rate rose to 4–5 ccs. per hour. The device was operated over a total period of one month during which time it was not necessary to flush, wash out or otherwise adjust the unit. At the end of the period, the distillation rate was the same as the initial rate.

EXAMPLE 2

A distillation tube 2⅝ inches outside diameter and 1⅝ inches inside diameter and having a working length of 5½ feet was placed within a clear plastic tube of three inches outside diameter. At 39° latitude, the average distillation rate over a 7-hour period was 454 ccs.

For larger units or those having tubes of great length using the bottom feed principal, it may be desirable to provide pump means to temporarily raise the water to near the top of the tube so as to wet down the tube and start the feeding operation. In this case, the feed will be a closed tube rather than an open trough.

In another embodiment, the evaporator is made in the form of a bar or sheet of microporous material. FIG. 4 shows in cross section a solar still making use of a bar evaporator member 80. Other parts of the still are similar to the still shown in FIG. 2. When using a sheet or bar-shaped evaporator, the methods for feeding and cleaning described for tubular evaporators are equally suitable. It will be seen that the bar type evaporator will have additional strength compared to a tubular evaporator but that it will require more material in its fabrication.

Finally, it will be observed that the device of this invention is well suited for concentrating dilute salt containing brines. The arrangement of several evaporating tubes in series array along a single feed conduit such as shown in FIGS. 1 and 2 automatically acts as a multi-effect evaporator for the discharge from the first evaporator feeds the second tube and so on down the line. When so used, the condenser and collecting tube is not necessary, the water vapor then passing off into the atmosphere.

In its simplest form, the concentrator or evaporator comprises at least one free standing evaporator member suitable for solar heating of microporous material supported by a base, the base including a single means for feeding dilute impure water to the base of the evaporator and for removing concentrated impure water therefrom.

Whereas, the invention has been described with reference to specific forms thereof, it will be understood that many changes and modifications may be made without departing from the spirit of the invention.

What is claimed is:

1. A self-cleaning solar evaporating device for evaporating pure water vapor from impure water which comprises a base, a free standing evaporator tubular member suitable for solar heating extending perpendicularly from the base, the evaporator member being made of microporous plastic material, the evaporator member being supported by the base, the evaporator member having a bottom portion attached to the base, the base including a single means for feeding dilute impure water to the bottom portion of the evaporator member and for removing concentrated impure water therefrom.

2. A self-cleaning solar evaporating device as defined in claim 1 including means for condensing the water vapor evaporated by the evaporator member.

3. A self-cleaning solar evaporating device as defined in claim 2 wherein the means for condensing the water vapor evaporated by the evaporator member comprises a clear transparent tube, the tube surrounding the evaporator member and being spaced therefrom.

4. A self-cleaning solar evaporating device as defined in claim 2 including a collecting means for collecting condensed vapor located at the base of the means for condensing the water vapor.

5. A self-cleaning solar evaporating device as defined in claim 3 wherein the inner surface of the clear transparent tube includes a surfactant.

6. A self-cleaning solar evaporating device as defined in claim 5 wherein the surfactant is sodium lauryl sulfate.

7. A self-cleaning solar evaporating device as defined in claim 1 wherein the material from which the microporous evaporator member is made is selected from the group which consists of microporous polyethylene, microporous polypropylene, microporous polyvinyl chloride, microporous polystyrene, microporous natural rubber and microporous synthetic rubber.

8. A self-cleaning solar evaporating device as defined in claim 7 wherein the surface of the evaporator member is black for maximum retention of solar energy.

9. A self-cleaning solar evaporating device as defined in claim 1 including means for controlling the level of the dilute impure water in the means for feeding the impure water to the base of the evaporator member.

10. A self-cleaning solar evaporating device as defined in claim 9 including means for temporarily raising the level of the dilute impure water to near the top of the evaporator member.

11. A self-cleaning solar evaporating device as defined in claim 1 including means to channel the rays of the sun on the evaporator member.

12. A self-cleaning solar evaporating device as defined in claim 1 including a mounting for supporting the base so that the solar evaporating device may be directed toward the sun's rays.

References Cited

UNITED STATES PATENTS

| | | | |
|---|---|---|---|
| 2,427,262 | 9/1947 | Delano | 202—234 X |
| 3,193,473 | 7/1965 | Beard | 202—234 |
| 3,300,393 | 1/1967 | Fisher | 159—1 S |
| 3,351,538 | 11/1967 | Andrassy | 203—10 X |
| 2,412,466 | 12/1946 | Miller | 202—234 |
| 3,390,056 | 6/1968 | Ingram | 202—234 X |
| 3,161,574 | 12/1964 | Elam | 202—236 |
| 2,405,877 | 8/1946 | Delano | 202—234 |

NORMAN YUDKOFF, Primary Examiner

D. EDWARDS, Assistant Examiner

U.S. Cl. X.R.

202—237, 172; 203—Dig. 1, Dig. 10, Dig. 17; 159—1 S, Dig. 27